July 28, 1936.   H. T. THOMAS ET AL   2,049,234
TRANSMISSION MECHANISM
Filed April 3, 1935    2 Sheets-Sheet 1

INVENTOR.
Horace T. Thomas
Albert B. Hays
BY
ATTORNEY.

July 28, 1936.  H. T. THOMAS ET AL  2,049,234

TRANSMISSION MECHANISM

Filed April 3, 1935  2 Sheets-Sheet 2

INVENTOR.
Horace T. Thomas
BY Albert B. Hays
ATTORNEY

Patented July 28, 1936

2,049,234

UNITED STATES PATENT OFFICE 2,049,234

TRANSMISSION MECHANISM

Horace T. Thomas and Albert B. Hays, Lansing, Mich., assignors to Reo Motor Car Company, a corporation of Michigan Application April 3, 1935, Serial No. 14,392

6 Claims. (Cl. 184—11)

This invention relates to variable speed transmission mechanism of that type in which certain gears or gear clusters are only intermittently in action while other portions of the mechanism are in constant rotation at all times when power is transmitted.

It is the object of the invention to provide for adequate lubrication of the mechanism and at the same time to avoid frictional losses and the development of heat caused by the churning of the oil.

Other objects and advantages of the invention will become apparent from a reading of the following description taken in connection with the accompanying drawings in which, Fig. 1 is a longitudinal, vertical, sectional view through the transmission mechanism including our improved construction;

Figure 2:
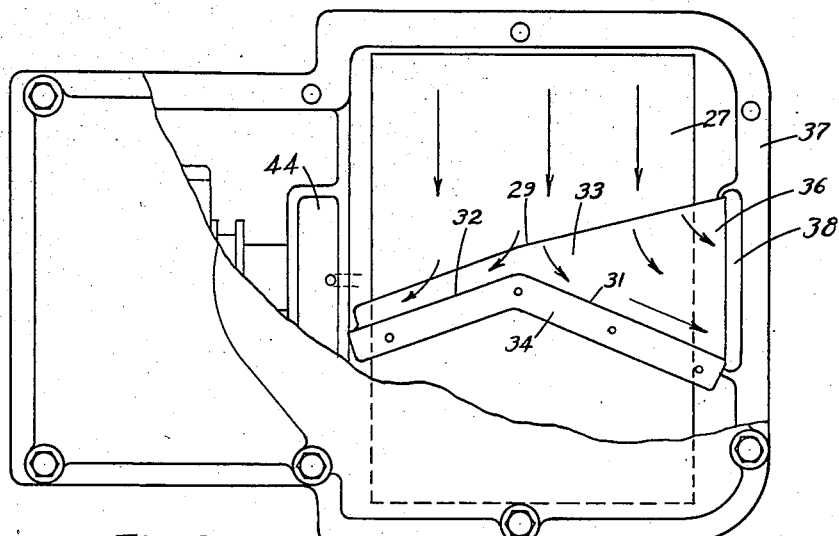
Fig. 2 is a fragmentary top plan view of the mechanism shown in Fig. 1.

Referring now to the drawings, reference numeral 9 represents a housing for the variable speed transmission mechanism having a detachable cover plate 11. The transmission mechanism may be varied in construction, but as specifically shown includes a main driving shaft 12 and a driven shaft 13 suitably journaled in the housing as at 14 and 15 and provided with axial recesses 16 and 17, respectively, in the ends thereof. The shaft 12 is provided with a suitable driving pinion 20 and the driven shaft may be provided with a suitable driven gear (not shown). An intermediate shaft 26 is journaled between the driving shaft 12 and the driven shaft 13 in the recesses 16 and 17 respectively, the ends of the intermediate shaft being sufficiently spaced from the ends of the recesses to provide lubricant chambers 18 and 19. A countershaft 21 is arranged below the shafts 12 and 26 and is provided with a gear cluster including the gears 22, 23 and 24, and the intermediate shaft 26 is provided with an internal-external gear 25 adapted to mesh internally with the pinion 20 or externally with the gear 23 on the countershaft 21. Suitable means (not shown) is also provided for shifting these gears to transmit movement from the driving shaft 12 to the intermediate shaft 26 at varying speeds and in forward and reverse directions.

In addition to the parts thus far described, there is provided an automatic gear shifting mechanism which is arranged between the intermediate shaft 26 and the driven shaft 13 in axial alignment therewith. The construction of this automatic transmission mechanism is not essential to the present invention, it being sufficient to state that it is of the centrifugally controlled planetary type, the elements of which, including centrifugally responsive weights 30, are enclosed within a drum 27 connected to the driven shaft 13 and therefore revolving in the housing whenever the latter shaft is driven.

To lubricate the gears when running in mesh, it is desirable to provide a relatively large coat of lubricant, which has the function of a cooling medium to dissipate the frictionally produced heat. On the other hand, when the gears are not in action, it is desirable to avoid the immersion of any rotating part in the lubricant to any appreciable extent as this will churn the oil and develop heat. The gears 22, 23 and 24 are normally out of mesh with the gears 20 and 25 on the aligned shafts 12 and 26, and consequently the former normally remain stationary and may be immersed in oil without detriment.

To avoid on the one hand the churning of the oil and on the other to maintain an adequate supply of lubricant on hand and in contact with the gears 22, 23 and 24 when in action, the following construction has been devised.

Between the portion of the housing 10 containing respectively the gears 22, 23, 24, 20 and 25 and the portion containing the revolving drum 27, is arranged a partition 28 which divides the housing into two compartments and which also forms a support for the bearings for the intermediate shaft 26. This partition terminates short of the upper end of the housing, and secured to the cover 11 above the partition and the drum, and extending over and in close proximity to the outer periphery of the drum, is arranged a deflector plate 29 for collecting lubricant thrown upwardly by the revolving drum 27 and delivering it under pressure to the moving parts of the transmission mechanism.

Preferably this deflector comprises a curved plate 33 conforming in shape to the periphery of the drum 27 and extending transversely in slightly spaced relation thereto and a pair of angular guide portions 31 and 32 formed by the upturned rear edge of the plate 33. A flange 34 is formed at the top of the guide portions and is suitably secured to the removable cover plate 11 of the housing.

As shown in Fig. 2, the guide portions 31 and 32 of the deflector are formed in substantially inverted V-shape, the apex thereof being positioned to the left of the center line of the drum member 27. It will be noted that the guide portion 31 is longer and positioned at a greater angle relative to the axis of the drum member than the guide portion 32. It will also be observed that the portion of the curved plate 33 adjacent the guide portion 31 is of greater area than the portion thereof adjacent the guide 32.

By means of the above construction, lubricant thrown upwardly by the revolving drum 27 will be collected by the plate 33 of the deflector and forced against the guide portions 31 and 32, and will be delivered therefrom under considerable pressure due to the restricted channel formed by the plate 33 and the cover 11 and the force with which the lubricant is thrown against the guides 31 and 32. Due to the relatively greater angularity and length of the guide portion 31, it is obvious that the greater portion of the lubricant thrown upwardly by the drum will pass along this guideway and will be delivered under somewhat greater pressure than the lubricant passing along the guideway 32.

Figure 1:
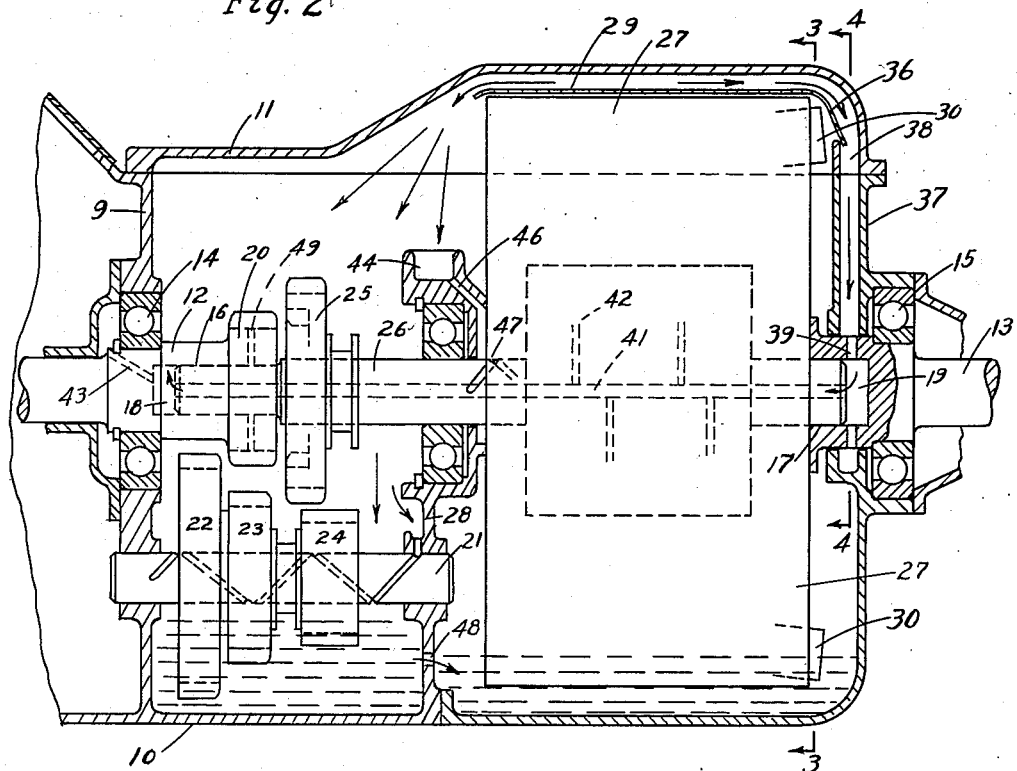
Figure 3:
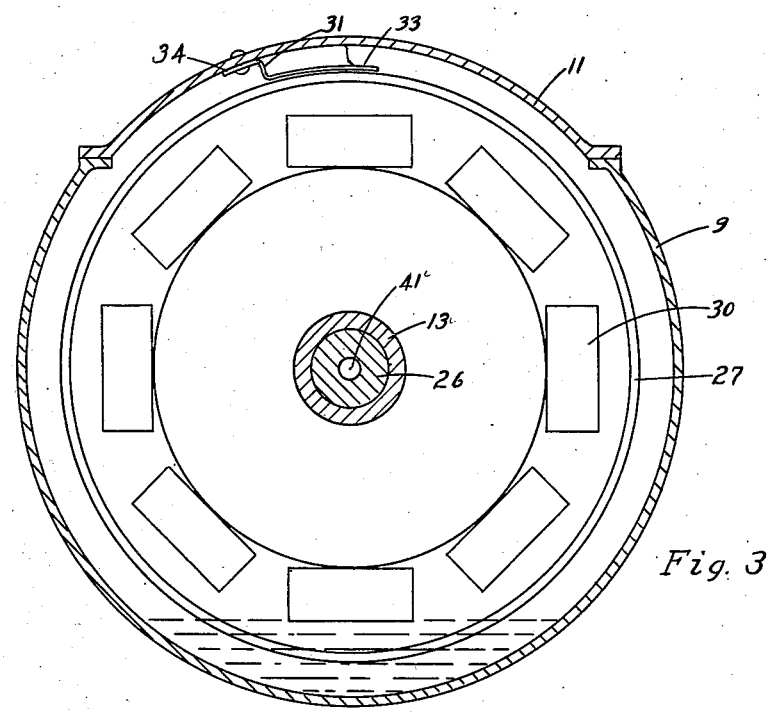
Fig. 3 is a sectional view taken substantially on the line 3—3 of Fig. 1.
Figure 4:
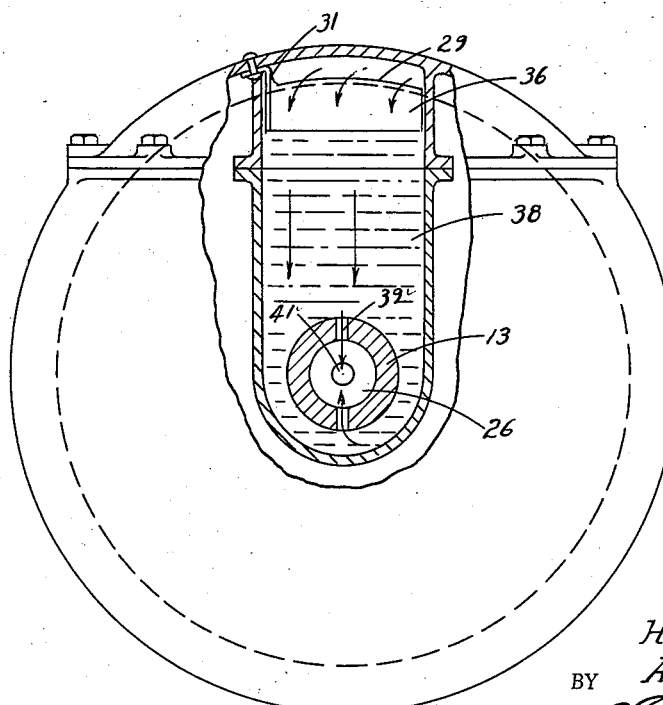
Fig. 4 is a similar view taken substantially on the line 4—4 of Fig. 1.

The following construction has been devised to direct the lubricant under pressure from the deflector to the moving parts of the transmission mechanism. The portion of the deflector adjacent the guideway 31 is formed with a depending lip portion 36 extending over the edge of the drum member and downwardly adjacent the end 37 of the housing. This lip portion 36 terminates at the open end of a vertically extending passageway 38 formed in the end of the housing 37, which passageway surrounds the head of the driven shaft 13. From Figs. 1 and 4, it will be observed that radial passageways 39 are formed in the driven shaft 13 to provide communication between the passageway 38 and the chamber 19.

The intermediate shaft 26 may be provided with an axial bore 41 providing communication between the chamber 19 in the head of the driven shaft 13 and the chamber 18 in the head of the driving shaft 12, and may also be provided with a plurality of radially extending outlets 42 leading to various portions of the automatic variable speed mechanism. Suitable communication 43 may also be provided between the chamber 18 and the bearings 14 of the driving shaft 12.

From the construction thus far described, it will be observed that lubricant thrown upwardly by the constantly revolving drum 27 will be collected by the deflector 29, divided and delivered under pressure to the transmission mechanism. A portion of the lubricant thrown upwardly by the drum will be delivered to the passageway 38, then through ports 39 into the chamber 19 of the driven shaft and thence through the axial bore 41 of the intermediate shaft 26. A portion of the lubricant flowing through the intermediate shaft will find its way outwardly through the radial bores 42 to the various moving parts of the automatic transmission mechanism and the remaining portion will flow to the chamber 18 and to the bearing 14. The other portion of the lubricant thrown upwardly by the drum will be delivered under less pressure by guideway 32 over the partition 28 into the compartment 10 containing the change speed gear mechanism. A portion of the lubricant thus delivered to compartment 10 may be collected by a suitable cup or receptacle 44 secured to the partition 28 and delivered through one or more channels 46 interiorly of the drum to the exterior of the intermediate shaft 26 and carried by a spiral groove 47 thereon along the exterior surface thereof. The remaining portion of the lubricant delivered into the compartment 10 will splash over the gears therein or through radial ducts 49 in the pinion 20 and will eventually find its way to the lower portion of the compartment and thence through a restricted drain passage or port 48 in the lower portion of the partition 28 into the compartment containing the automatic transmission mechanism.

With the construction as thus described, a sufficient supply of lubricant is placed within the housing 10 to last between periods of lubrication and to provide adequate lubrication and cooling of the gears 22, 23, 24, 20 and 25 when in action. When the mechanism is stationary, the lubricant flowing through the port 48 will equalize levels in the two compartments on opposite sides of the partition. However, as soon as the parts are in movement, the rotation of the drum 27 will quickly transfer the greater portion of the lubricant in that compartment to the passageway 38 and the compartment 10, thereby reducing the frictional resistance to the movement of the drum and the mechanism carried thereby and the resulting heating of the oil.

What is claimed and desired to be secured by Letters Patent is:

1. In a transmission mechanism, a housing having a lubricant therein, a partition in said housing dividing the same into separate compartments, transmission gearing in one of said compartments, transmission gearing in the other of said compartments comprising a drum member partially immersed in said lubricant and which is in constant rotation when power is transmitted, an oil duct leading to the moving parts of said gearing, and a deflector associated with said drum for collecting lubricant thrown upwardly thereby, said deflector having a pair of guide portions positioned in angular relation to the axis of said drum for directing a portion of the lubricant into said first-named compartment and another portion into said oil duct.

2. In a transmission mechanism, a housing having a lubricant therein, a partition in said housing dividing the same into separate compartments, transmission gearing in one of said compartments, transmission gearing in the other of said compartments comprising a drum member partially immersed in said lubricant and which is in constant rotation when power is transmitted, an oil duct leading to the moving parts of said gearing, and a deflector associated with said drum for collecting lubricant thrown upwardly thereby, said deflector having a pair of guide portions positioned in angular relation to the axis of said drum for directing a portion of the lubricant into said first-named compartment and another portion into said oil duct, the guide portion leading to said oil duct being relatively longer and positioned at a greater angle than the other guide portion.

3. In a transmission mechanism, a housing having a lubricant therein, a partition in said housing dividing the same into separate compartments, transmission gearing in one of said compartments, transmission gearing in the other of said compartments comprising a drum member partially immersed in said lubricant and which is in constant rotation when power is transmitted, an oil duct leading to the moving parts of said gearing, and a deflector associated with said drum for collecting lubricant thrown upwardly thereby, said deflector comprising a pair of guideways arranged substantially in the form of an inverted V and positioned in such a manner that the lubricant is divided over the apex of the V and the two portions thereof are delivered respectively to said first compartment and to said oil duct.

4. In a transmission mechanism, a housing having a lubricant therein, a partition in said housing dividing the same into separate compartments, transmission gearing in one of said compartments, transmission gearing in the other of said compartments comprising a drum member partially immersed in said lubricant and which is in constant rotation when power is transmitted, an oil duct leading from said drum compartment to the moving parts of said gearing, and a deflector associated with said drum and said oil duct for collecting lubricant thrown upwardly by said drum and delivering same to said oil duct, said deflector having a guideway, one wall of which is at an angle to the axis of said drum.

5. In a transmission mechanism, a housing adapted to contain a lubricant and having a passageway formed in a wall thereof, transmission gearing comprising a drum member partially immersed in said lubricant and which is in constant rotation when power is transmitted, a deflector associated with said drum having a guide portion for conveying lubricant thrown upwardly by said drum to said passageway, spaced axially aligned driving and driven shafts having recesses formed in the ends thereof, said driven shaft having radial ducts communicating with the recess therein, and an intermediate shaft journaled in the ends of said driving and driven shafts having an axial bore therethrough connecting said recesses and also having a plurality of radial outlets communicating with said axial bore and leading to portions of said transmission gearing.

6. In a transmission mechanism, a housing adapted to contain a lubricant and having a passageway formed in a wall thereof, automatic variable speed transmission gearing in a portion of said housing including a drum member partially immersed in said lubricant and which is in constant rotation when power is transmitted, manually operable shift gearing in another portion of said housing, a partition in said housing dividing the same into separate compartments, the one holding said drum and the other said manually operable shift gearing, said partition terminating short of the top of said housing, a two-way deflector secured to the top of said housing above said partition adjacent the periphery of said drum and having guide portions for conveying a portion of the lubricant thrown upwardly by said drum to said passageway and a portion over the partition into the compartment containing said manually operable shift gearing, spaced axially aligned driving and driven shafts having recesses formed in the ends thereof, said driven shaft having radial passages communicating with the recess therein, and an intermediate shaft journaled in the ends of said driving and driven shafts and having an axial bore therethrough connecting said chambers, said intermediate shaft also having a plurality of radial outlets communicating with said axial bore and leading to portions of said automatic variable speed transmission gearing, a receptacle mounted on said partition within the compartment containing said manual shift gearing for receiving a portion of said lubricant and conducting the same through said partition to the exterior portion of said intermediate shaft interiorally of said drum, and means permitting a restricted flow of lubricant from the shift gear compartment back to the drum compartment.

HORACE T. THOMAS.
ALBERT B. HAYS.